United States Patent
Kimura

(10) Patent No.: US 8,156,524 B2
(45) Date of Patent: Apr. 10, 2012

(54) CONTENT PREFERENCE CALCULATION METHOD AND CONTENT RECEPTION APPARATUS

(75) Inventor: Hitoshi Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1518 days.

(21) Appl. No.: 10/363,714

(22) PCT Filed: Jul. 4, 2002

(86) PCT No.: PCT/JP02/06811
§ 371 (c)(1),
(2), (4) Date: Aug. 29, 2003

(87) PCT Pub. No.: WO03/007593
PCT Pub. Date: Jan. 23, 2003

(65) Prior Publication Data
US 2004/0068741 A1    Apr. 8, 2004

(30) Foreign Application Priority Data
Jul. 9, 2001  (JP) ................................. 2001-208043

(51) Int. Cl.
*G06F 3/00* (2006.01)
(52) U.S. Cl. ............................................. 725/43; 725/9
(58) Field of Classification Search ............... 725/9–21, 725/34–35, 46
See application file for complete search history.

(56) References Cited

U.S. PATENT DOCUMENTS
5,977,964 A * 11/1999 Williams et al. ............... 715/721
6,118,437 A * 9/2000 Fleck et al. .................... 345/179
(Continued)

FOREIGN PATENT DOCUMENTS
JP          9-83891         3/1997
(Continued)

OTHER PUBLICATIONS

Koji Miyahara, et al., Study of the TV program recommendation system based on the watching history by users, No. 54 (1997 first half) National convention lecture memoirs (4), Information Processing Society of Japan, Mar. 14, 1997, pp. 4-245-4-246.

(Continued)

*Primary Examiner* — Brian Pendleton
*Assistant Examiner* — Olugbenga Idowu
(74) *Attorney, Agent, or Firm* — Frommer Lawrence & Haug LLP; William S. Frommer; Thomas F. Presson

(57) ABSTRACT

A content preference degree calculating method and system that calculates preference degrees of viewers to contents such as broadcast programs in conformity with the actual viewing pattern. In a preference degree calculating unit, the value of a function which is based on at least the rate Ru (=Dw/Lu) of a viewing time (Dw) of the content concerned to a unit time (Lu) and the rate Rc (=Dw/Lc) of the viewing time (Dw) of the content concerned to the time length (Lc) of the content concerned. When the preference degree (Pr) increases as the rate (Ru) is increased and the preference degree (Pr) increases as the rate (Rc) is increased is calculated as a preference degree (Pr) of a viewer to the program concerned from program viewing record data. A formula is Pr=Ru+Rc=(Dw/Lu)+(Dw/Lc). In a preference degree renewing unit, the preference degree (Pr) is added to a pre-renewal preference degree (Po) recorded in a preference data base by some rate, and the preference degree (Pn) after the addition is recorded as a post-renewal preference degree into the preference data base.

11 Claims, 14 Drawing Sheets

U.S. PATENT DOCUMENTS

| | | | |
|---|---|---|---|
| 6,772,433 B1* | 8/2004 | LaJoie et al. | 725/52 |
| 7,013,478 B1* | 3/2006 | Hendricks et al. | 725/46 |
| 2002/0129368 A1* | 9/2002 | Schlack et al. | 725/46 |
| 2002/0152474 A1* | 10/2002 | Dudkiewicz | 725/136 |
| 2002/0199193 A1* | 12/2002 | Gogoi et al. | 725/46 |

FOREIGN PATENT DOCUMENTS

| | | |
|---|---|---|
| JP | 10-257405 | 9/1998 |
| JP | 11 164213 | 6/1999 |
| JP | 2000 13708 | 1/2000 |
| JP | 2000 269840 | 9/2000 |
| JP | 2000-333085 | 11/2000 |
| JP | 2001-134706 | 5/2001 |
| JP | 2002 374462 | 12/2002 |

OTHER PUBLICATIONS

Taro Nakajima, et al., An Implementation of a TV Program Selection Support Agent and its Evaluation, Information Processing Society of Japan memoir, Information Processing Society of Japan, Feb. 21, 2001, it is vol. 2001, No. 15, pp. 7-12.

* cited by examiner

FIG. 3

| OPERATING DATE AND HOUR | VIEWING OUTPUT STATE | OPERATION CONTENT | REPRODUCTION POSITION |
|---|---|---|---|
| 2000 YEAR, NOVEMBER, SEVENTH DAY, 19 O'CLOCK, 00 MINUTE, 00 SECOND | Ch = 1, Vol = 10 | No Op | |
| 2000 YEAR, NOVEMBER, SEVENTH DAY, 19 O'CLOCK, 05 MINUTES, 05 SECONDS | Ch = 1, Vol = 11 | Vol + = 1 | |
| 2000 YEAR, NOVEMBER, SEVENTH DAY, 19 O'CLOCK, 15 MINUTES, 35 SECONDS | Ch = 1, Vol = 10 | Vol _ = 1 | |
| 2000 YEAR, NOVEMBER, SEVENTH DAY, 19 O'CLOCK, 16 MINUTES, 10 SECONDS | Ch = 8, Vol = 10 | Ch = 8 | |
| 2000 YEAR, NOVEMBER, SEVENTH DAY, 19 O'CLOCK, 22 MINUTES, 18 SECONDS | Ch = 8, Vol = 11 | Vol + = 1 | |
| 2000 YEAR, NOVEMBER, SEVENTH DAY, 19 O'CLOCK, 28 MINUTES, 52 SECONDS | Ch = v3, Vol = 11 | Ch = video3 | Vt = 030001 |

FIG. 4

| ATTRIBUTE | CONTENT |
|---|---|
| PROGRAM ID | 0011071900101 |
| BROADCAST START DATE AND HOUR | 2000 YEAR, NOVEMBER, SEVENTH DAY, 19 O'CLOCK 00 MINUTE, 00 SECOND |
| BROADCAST FINISH DATE AND HOUR | 2000 YEAR, NOVEMBER, SEVENTH DAY, 19 O'CLOCK 00 MINUTE, 30 SECONDS |
| REPRODUCTION START/FINISH POSITION | NON (REAL BROADCAST) |
| DISTRIBUTING SOURCE | GROUND-BASED BROADCASTING, 1Ch, NHK FIRST |
| GENRE | NEWS |
| TITLE | NEWS 7 |
| CONTENT 1 | ELECTION OF PRESIDENT OF U.S.A |
| CONTENT 2 | THE SETTING-IN OF AUTUMN |

FIG. 5

| ATTRIBUTE | CONTENT | | | |
|---|---|---|---|---|
| PROGRAM ID | 00110719000101 | | | |
| BROADCAST START DATE AND HOUR | 2000 YEAR, NOVEMBER, SEVENTH DAY, 19 O'CLOCK 00 MINUTE, 00 SECOND | | | |
| BROADCAST FINISH DATE AND HOUR | 2000 YEAR, NOVEMBER, SEVENTH DAY, 19 O'CLOCK 00 MINUTE, 30 SECONDS | | | |
| REPRODUCTION START/FINISH POSITION | vt = 030001 - 031200 | | | |
| DISTRIBUTING SOURCE | GROUND-BASED BROADCASTING, 1Ch, NHK FIRST | | | |
| GENRE | NEWS | | | |
| TITLE | NEWS 7 | | | |
| TOPIC 1 | ELECTION OF PRESIDENT OF U.S.A | START: 5 MINUTES PAST 19 O'CLOCK | FINISH: 10 MINUTES PAST 19 O'CLOCK | ...... |
| TOPIC 2 | XX CASE | START: 10 MINUTES PAST 19 O'CLOCK | FINISH: 15 MINUTES PAST 19 O'CLOCK | ...... |
| TOPIC 3 | WEATHER OF TOMORROW | START: 15 MINUTES PAST 19 O'CLOCK | FINISH: 20 MINUTES PAST 19 O'CLOCK | ...... |
| ...... | | | | |

FIG. 6

| ATTRIBUTE | CONTENT |
|---|---|
| PROGRAM ID | 00110719000101 |
| VIEWING SOURCE | REAL BROADCAST |
| VIEWING TIME (Dw) | 00 HOUR, 11 MINUTES, 05 SECONDS |
| VIEWING RATE (Rc) | 0.369 |
| TOTAL OPERATION FREQUENCY | 5 |
| VOLUME OPERATION FREQUENCY | 3 |
| VOLUME TURN-UP OPERATION FREQUENCY | 2 |
| VOLUME TURN-DOWN OPERATION FREQUENCY | 1 |
| TUNING OPERATION FREQUENCY | 2 |
| DATA DISPLAY OPERATING FREQUENCY | 0 |
| PROGRAM IDENTIFICATION INFORMATION | |

| VIEWING SOURCE | REPRODUCTION | |
|---|---|---|
| VIEWING TIME (Dw) | 00 HOUR, 11 MINUTES, 05 SECONDS | |
| VIEWING TIME EVERY DAY OF WEEK/EVERY HOUR | MONDAY, 00:00 - 01:00 | 0 |
| | MONDAY, 01:00 - 02:00 | 0 |
| | ...... | ...... |
| | MONDAY, 22:00 - 23:00 | 00 HOUR, 07 MINUTES, 10 SECONDS |
| | MONDAY, 23:00 - 00:00 | 00 HOUR, 03 MINUTES, 55 SECONDS |
| | TUESDAY, 00:00 - 01:00 | 0 |
| | TUESDAY, 01:00 - 02:00 | 0 |
| | ...... | ...... |

FIG. 10

| ATTRIBUTE | CONTENT |
|---|---|
| PROGRAM ID | 00110719000101 |
| PREFERENCE DEGREE (Pr) | 0.532 |
| CERTAINTY OF PREFERENCE DEGREE (Tx) | 0.75 |
| PROGRAM IDENTIFICATION INFORMATION | |

| ATTRIBUTE | CONTENT |
|---|---|
| PROGRAM ID | 00110719000801 |
| PREFERENCE DEGREE (Pr) | 0.237 |
| CERTAINTY OF PREFERENCE DEGREE (Tx) | 0.4 |
| PROGRAM IDENTIFICATION INFORMATION | |

FIG. 11

| ATTRIBUTE | CONTENT | |
|---|---|---|
| PROGRAM TITLE | NEWS 7 | |
| DISTRIBUTING SOURCE | GROUND-BASED BROADCASTING, 1Ch, NHK FIRST | |
| BROADCAST DAY | EVERYDAY | |
| BROADCAST START TIME | 00 MINUTE PAST 19 O'CLOCK | |
| BROADCAST FINISH TIME | 30 MINUTES PAST 19 O'CLOCK | |
| REAL BROADCAST PREFERENCE DEGREE | 0.625 | |
| REPRODUCTION PREFERENCE DEGREE | 0.381 | |
| PREFERENCE DEGREE EVERY DAY OF WEEK/EVERY TIME ZONE | MONDAY, 00:00 - 01:00 | 0 |
| | MONDAY, 01:00 - 02:00 | 0 |
| | ⋮ | ⋮ |
| | MONDAY, 22:00 - 23:00 | 0.246 |
| | MONDAY, 23:00 - 00:00 | 0.135 |
| | TUESDAY, 00:00 - 01:00 | 0 |
| | ⋮ | ⋮ |

FIG. 12

| RECORDING START DATE AND HOUR | RECORDING FINISH DATE AND HOUR | DISTRIBUTING SOURCE | PROGRAM TITLE | RECORDING REASON |
|---|---|---|---|---|
| 2001 YEAR, FEBRUARY 1, 19 O'CLOCK, 00 MINUTE, 00 SECOND | 19 O'CLOCK, 30 MINETES, 00 SECOND | NHK FIRST | NEWS 7 | 1 (RECORDING BASED ON RECORDING RESERVATION) |
| 2001 YEAR, FEBRUARY 1, 19 O'CLOCK, 53 MINUTES, 00 SECOND | 20 O'CLOCK, 54 MINETES, 00 SECOND | FUJI TV. | UNBELIEVABLE | 2 (RECORDING BASED ON REGISTRATION KEYWORD) |
| 2001 YEAR, FEBRUARY 1, 21 O'CLOCK, 54 MINUTES, 00 SECOND | 23 O'CLOCK, 09 MINETES, 00 SECOND | TV. ASAHI | NEWS ST | 3 (RECORDING BASED ON PREFERENCE DEGREE) |
| ......... | ......... | ......... | ......... | ......... |

FIG. 13

$$\begin{cases} \text{Pr: PREFERENCE DEGREE} \\ \text{Dw: VIEWING TIME} \\ \text{Lc: PROGRAM TIME LENGTH} \\ \text{Lu: UNIT TIME} \\ \text{Cr: CONSTANT} \\ m > 0 \\ n > 0 \end{cases}$$

$$Pr = \left(\frac{Dw}{Lu}\right)^m + \left(\frac{Dw}{Lc}\right)^n \quad \cdots\cdots (1)$$

$$Pr = \left(\frac{Dw}{Lu}\right)^m \times \left(\frac{Dw}{Lc}\right)^n \quad \cdots\cdots (2)$$

$$Pr = m \cdot \log\left(\frac{Dw}{Lu} + Cr\right) + n \cdot \log\left(\frac{Dw}{Lc} + Cr\right) \quad \cdots\cdots (3)$$

$$Pr = \log\left(\frac{Dw}{Lu} + Cr\right) \times \log\left(\frac{Dw}{Lc} + Cr\right) \quad \cdots\cdots (4)$$

FIG. 14

| PROGRAM | PROGRAM TIME LENGTH Lc (TIME) | VIEWING TIME Dw (TIME) | VIEWING TIME RATE $Rc = \frac{Dw}{Lc}$ | PREFERENCE DEGREE Pr | | | |
|---|---|---|---|---|---|---|---|
| | | | | MODEL 1 EQUATION (1) Lu = 1 (TIME) m = n = 1 | MODEL 2 EQUATION (1) Lu = 1 (TIME) m = n = 0.5 | MODEL 3 EQUATION (2) Lu = 1 (TIME) m = n = 1 | MODEL 4 EQUATION (2) Lu = 1 (TIME) m = n = 0.5 |
| A | 1.000 | 0.493 | 0.49 | 0.98 | 1.40 | 0.24 | 0.49 |
| B | 0.933 | 0.276 | 0.30 | 0.58 | 1.07 | 0.08 | 0.29 |
| C | 0.250 | 0.242 | 0.97 | 1.21 | 1.47 | 0.23 | 0.48 |
| D | 0.167 | 0.157 | 0.94 | 1.10 | 1.37 | 0.15 | 0.38 |
| $\frac{Pmax}{Pmin}$ | — | — | — | 2.09 | 1.37 | 3.00 | 1.69 |

FIG. 15

| PROGRAM | PROGRAM TIME LENGTH Lc (TIME) | VIEWING TIME Dw (TIME) | VIEWING TIME RATE $Rc = \dfrac{Dw}{Lc}$ | PREFERENCE DEGREE Pr | |
|---|---|---|---|---|---|
| | | | | MODEL 5 EQUATION (3) Lu = 1 (TIME) m = n = 1 Cr = 1.0 | MODEL 6 EQUATION (4) Lu = 1 (TIME) Cr = 1.0 |
| A | 1.000 | 0.493 | 0.49 | 0.35 | 0.30 |
| B | 0.933 | 0.276 | 0.30 | 0.32 | 0.12 |
| C | 0.250 | 0.242 | 0.97 | 0.39 | 0.28 |
| D | 0.167 | 0.157 | 0.94 | 0.35 | 0.18 |
| $\dfrac{Pmax}{Pmin}$ | — | — | — | 1.77 | 2.50 |

FIG. 16

- Pr: CALCULATED PREFERENCE DEGREE
- Po: PREFERENCE DEGREE BEFORE RENEWAL
- Pn: PREFERENCE DEGREE AFTER RENEWAL
- $\alpha$: ADDIITION COEFFICIENT ($0 < \alpha < 1$)

$$Pn = \alpha \times Pr + (1 - \alpha) Po \quad \cdots\cdots (5)$$

FIG. 17

- Tx: CERTAINTY OF PREFERENCE DEGREE
- Cx: CONSTANT
- $\alpha$: ADDITION COEFFFICIENT ($0 < \alpha < 1$)

$$\alpha = Cx \times Tx \quad \cdots\cdots (6)$$

FIG. 18

- Pr: CALCULATED PREFERENCE DEGREE
- Po: PREFERENCE DEGREE BEFORE RENEWAL
- Pn: PREFERENCE DEGREE AFTER RENEWAL
- Pmax: MAXIMUM VALUE OF PREFERENCE DEGREE IN PREFERENCE DATA
- Pth: THRESHOLD VALUE
- Cth: CONSTANT $$Pn = Pr + Po \quad \cdots\cdots (7)$$

IF (Pmax > Pth), $$Pn = \frac{Pth - Cth}{Pmax} \times Po \quad \cdots\cdots (8)$$

CONTENT PREFERENCE CALCULATION METHOD AND CONTENT RECEPTION APPARATUS

TECHNICAL FIELD

The present invention relates to a method of calculating the degree of a viewer's preference for contents distributed through broadcasts or networks, and a content receiving apparatus having a function of calculating the degree of a viewer's preference for contents, and presenting contents to viewers or automatically receiving, recording and reproducing the contents on the basis of the preference degree thus calculated.

In the present invention, a content means a series of visually or acoustically recognizable information such as visual information (containing moving pictures, still pictures, graphics, etc.), character information and audio information of broadcast programs or the like.

BACKGROUND ART

For example, when a viewer (user) views a program with a Television receiving apparatus, one of the following methods has been hitherto adopted by the user.

(1) The viewer directly views a program of a channel selected at the time when power is turned on (for example, a channel selected at the power-off time before power is turned on.

(2) The viewer selects a channel on the basis of his/her memory.

(3) The viewer carries out so-called zapping of successively switching channels to find his/her wished program.

(4) The viewer selects a program by referring to a program guide inserted in a newspaper or magazine or EPG (Electronic Program Guide) distributed through broadcast or a network.

Some Television receiving apparatuses make it possible to register favorite channels and select a program while focusing into groups of the registered channels.

When a TV program is recorded, a user uses the following methods:

(1) An operation of recording a program is directly carried out during reception of the program;
(2) The broadcast date and hour and broadcast channel of a program are indicated and a recording reservation is made;
(3) A recording reservation is made by using G codes;
(4) A program is selected from EPG and a recording reservation is made; and
(5) A Television receiving apparatus is made to search a program from EPG information on the basis of a registered keyword and automatically record the program.

However, it needs much load and much time to zap all the programs of many channels or check programs through an EPG or the like under the present day that the digital broadcast becomes widespread and multi-channeling is advanced, and this is inefficient.

With respect to program recording, increase in capacity of recording media such as hard discs has brought television receiving apparatuses in which long-time and many programs can be recorded, and when the method of indicating programs individually and carrying out a recording operation or making a recording reservation like the prior art is used in such television receiving apparatuses, it needs much labor, and the reservation operation may be forgotten.

With respect to periodically-broadcasted programs, it is possible to register the program names or keywords and automatically make a program reservation. However, this method needs a cumbersome work of explicitly indicating the program names or the keyboards. In addition, since the preference of a viewer to programs is varied with respect to time lapse, registration contents must be changed in accordance with variation of preference.

Therefore, JP-A-2000-201303 discloses that a viewer's preference is judged from a record of program information achieved and program information is selected on the basis of the judgment result. JP-A-2000-341596 discloses that programs of plural real channels are selectively disposed along a viewer's pattern on the basis of a viewer's viewing record to create a virtual channel. JP-A-2000-155764 discloses that a viewer's preference inclination is specified to one of plural preference patterns on the basis of a viewer's program selection record to search programs which are coincident with the viewer's preference. JP-A-2000-293539 discloses that a viewer's preference is learned on the basis of a viewer's program selection record, and programs conformable with the viewer's preference are searched on the basis of the learning result. JP-A-2000-13708 discloses a program selection assist method of analyzing a viewer's viewing inclination from a viewer's program selecting operation and creating and displaying an electronic program guide based on the viewer's viewing inclination.

However, in the case of the conventional method of calculating the viewer's preference degree to a program on the basis of the viewing record of the program concerned, the preference degree to the program concerned is calculated from a program viewing time or the viewing time rate corresponding to the rate of the program viewing time to the program time length (program viewing time/program time length), and thus the preference degree is not necessarily accurately calculated in conformity with the actual situation.

More specifically, when the preference degree to the program concerned is calculated from the program viewing time, in the case of use of a calculation equation based on the assumption that the preference degree is proportional to the viewing time, the preference degree of a program is estimated to be lower as the time length of the program is shorter like the preference degree calculated when a program of 10 minutes is viewed from start to finish for 10 minutes is estimated to be equal to one sixth of the preference degree calculated when a program of 60 minutes is viewed from start to finish for 60 minutes.

On the other hand, when the preference degree to the program is calculated from the viewing time rate, in the case of use of a calculation equation based on the assumption that the preference degree is proportional to the viewing time rate, the preference degree calculated when a program of two hours and thirty minutes is viewed for one hour is equal to 0.4. Therefore, when the program time length is very long, the preference degree to the program is estimated to be low even when it is viewed for a long time. On the other hand, the preference degree calculated when a program of 20 minutes is viewed for 15 minutes is equal to 0.75. Therefore, when a short-time program is viewed for some degree of time or more, the preference degree to the program is estimated to be high even when the program is unconsciously viewed with no special purpose.

Therefore, an object of the present invention is to enable the preference degree of a viewer to contents such as broadcast programs to be accurately calculated in conformity with the actual situation.

DISCLOSURE OF THE INVENTION

A content preference degree calculating method of the present invention is a method of calculating the preference degree of a viewer to a content corresponding to a series of visually or acoustically recognizable information from a viewing record of the content concerned, characterized by calculating, as a preference degree Pr, the value of a function which is based on at least the rate Ru (=Dw/Lu) of a viewing time Dw of the content concerned to a unit time Lu and the rate Rc (=Dw/Lc) of the viewing time Dw of the content concerned to the time length Lc of the content concerned and in which the preference degree Pr is larger as the rate Ru is increased and also the preference degree Pr is larger as the rate Rc is increased.

According to the content preference degree calculating method of the invention as described above, for example, in the case where the preference degree Pr is calculated as the sum of the rate Ru of the viewing time Dw to the unit time Lu and the rate Rc of the viewing time Dw to the content time length Lc as shown below, $$Pr = Ru + Rc \quad (1a)$$
$$= (Dw/Lu) + (Dw/Lc)$$

assuming that the unit time Lu is equal to 60 minutes for example, the preference degree Pr calculated when a content of 10 minutes is viewed from start to finish for 10 minutes is equal to 1.17, the preference degree Pr calculated when a content of 60 minutes is viewed from start to finish for 60 minutes is equal to 2.00, the preference degree Pr calculated when a content of two hours and thirty minutes is viewed for one hour is equal to 1.40, and the preference degree Pr calculated when a content of 20 minutes is viewed for a fifteen minutes is equal to 1.00.

Accordingly, such situations that the preference degree of a program is estimated to be low as the content time length thereof is shorter, the preference degree of a program is estimated to be low in spite of long-time viewing when the content time length is very long, and the preference degree is estimated to be high when a short-time content is viewed for some degree of time or more although the program is little consciously viewed with no special viewing purpose can be reduced, and thus the preference degree can be accurately calculated in conformity with the actual situation.

BRIEF DESCRIPTION OF THE DRAWINGS

FIG. 3 is a diagram showing an example of viewing record data.

FIG. 4 is a diagram showing an example of program identification information.

FIG. 5 is a diagram showing another example of program identification information.

FIG. 6 is a diagram showing an example of program viewing record data.

FIG. 10 is a diagram showing an example of preference primary data

FIG. 11 is a diagram showing an example of preference data.

FIG. 12 is a diagram showing an example of a recorded program list.

FIG. 13 is a diagram showing an example of equations to calculate preference degree.

FIG. 14 is a diagram showing preference degree calculation results based on models of the equations shown in FIG. 13.

FIG. 15 is a diagram showing preference degree calculation results based on the models of the equations shown in FIG. 13.

FIG. 16 is a diagram showing an example of an equation to renew the preference degree.

FIG. 17 is a diagram showing a calculation equation of a coefficient in the equation shown in FIG. 16.

FIG. 18 is a diagram showing another example of the equations to renew the preference degree.

BEST MODE FOR CARRYING OUT THE INVENTION (Content Receiving Apparatus ... FIG. 1 to FIG. 12)

An accumulation type television receiving apparatus that receives programs of ground-based analog broadcast and satellite digital broadcast as contents and records them in a recording medium installed therein will be described as an embodiment of a content receiving apparatus according to the present invention.

Figure 1:
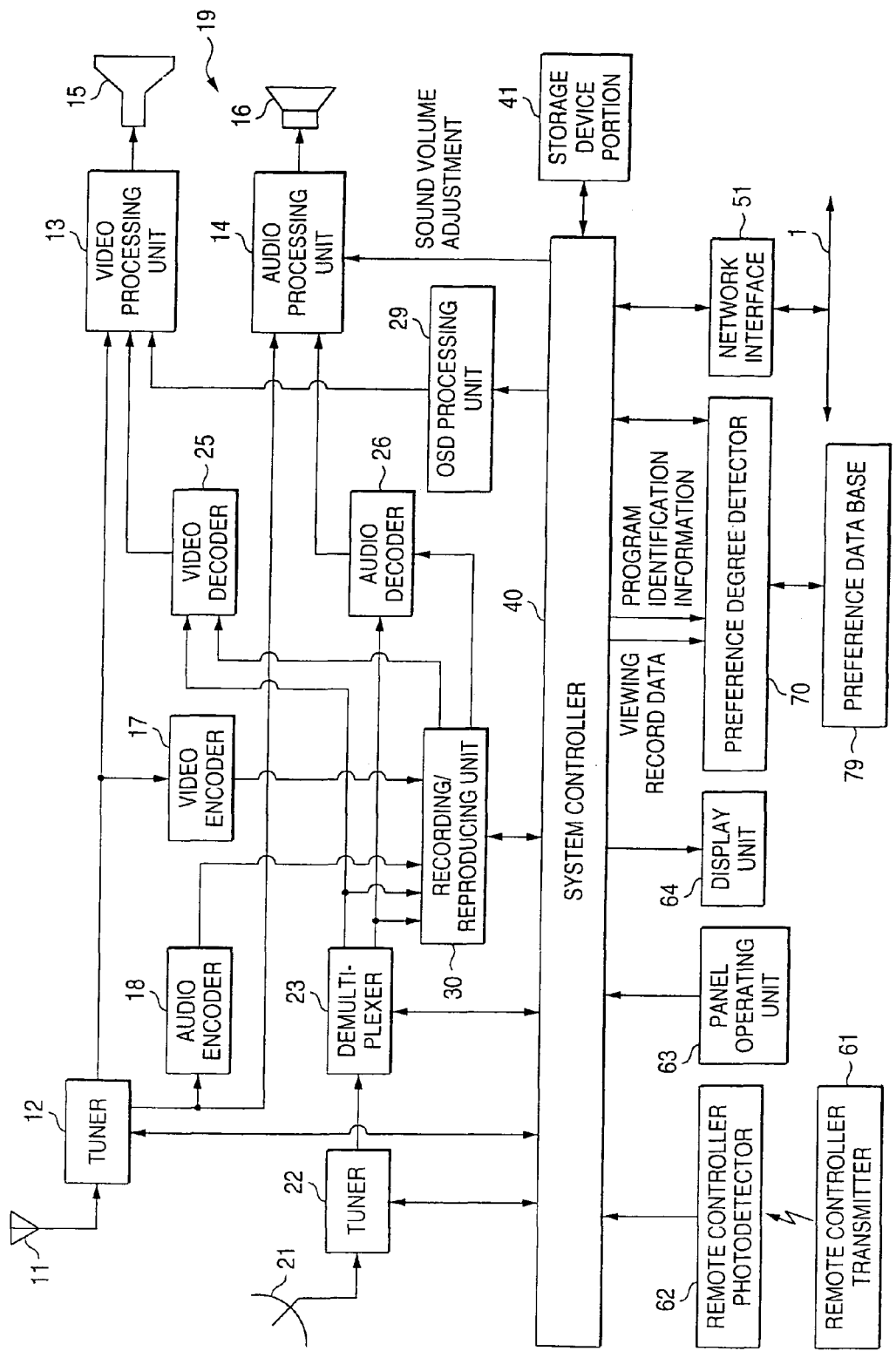
FIG. 1 is a diagram showing an embodiment of a content receiving apparatus of the present invention.
Figure 2:
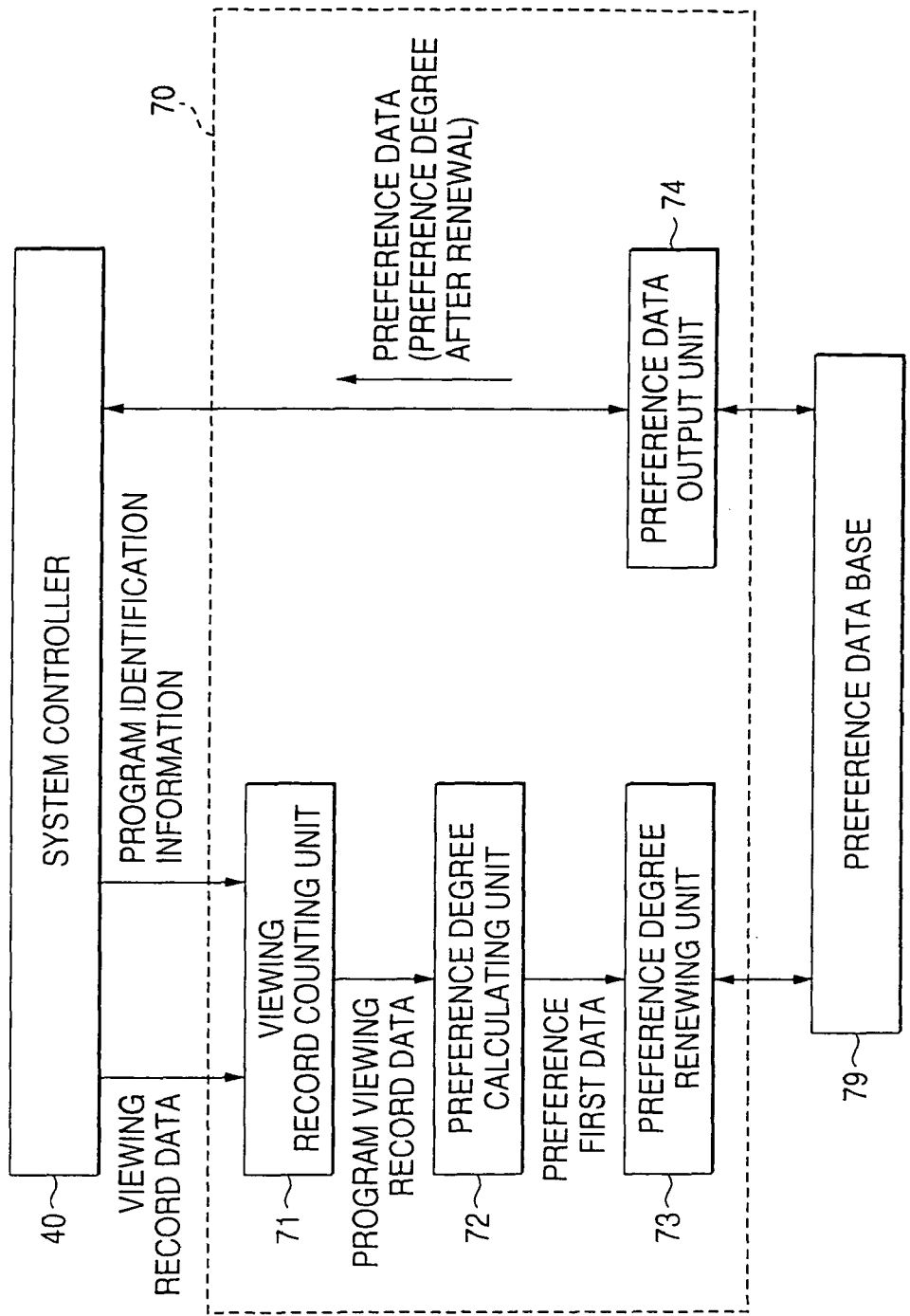
FIG. 2 is a diagram showing an example of a preference degree detecting unit.

(Summary of Receiving Apparatus ... FIGS. 1 and 2)

FIG. 1 shows an embodiment of the accumulation type television receiving apparatus.

In the receiving apparatus, broadcast signals of ground-based analog broadcast received by an antenna 11 are turned and demodulated by a tuner 12 and a video signal and an audio signal are achieved from the tuner 12.

The video signal is processed in a video processing unit 13 and transmitted to a display device 15 such as a CRT display or a liquid crystal display. The audio signal is processed in an audio processing unit 14, and transmitted to a sound output device 16 such as a speaker. The display device 15 and the sound output device 16 constitute a monitor device 19.

Furthermore, program addition information such as EPG information inserted in a gap between broadcast electric waves of the ground-based analog broadcast is taken from the tuner 12 into a system controller 40.

When a program is recorded, the video signal and the audio signal thereof from the tuner 12 are converted to digital video data and digital audio data in a video encoder 17 and an audio encoder 18 respectively, and further subjected to compression-coding based on the MPEG (Moving Picture Experts Group) system. The video data and audio data thus coded are transmitted to a recording/reproducing unit 30, and recorded into a recording medium such as a hard disc in the recording/reproducing unit 30.

On the other hand, the broadcast signals of the satellite digital broadcast received by antenna 21 are tuned by a tuner 22, and further subjected demodulation and error correction to be converted to a transport stream of the MPEG system.

The transport stream is transmitted to a demultiplexer 23, and the compressedly-coded video and audio data are separated from each other by the demultiplexer 23. The video data and the audio data thus separated are decoded by a video decoder 25 and an audio decoder 26 respectively, and further converted to an analog video signal and an analog audio signal respectively.

The video signal after the conversion is processed by the video processing unit 13 and then transmitted to the display device 15. The audio signal after the conversion is processed by the audio processing unit 14 and then transmitted to the audio output device 16.

Program addition information such as EPG information superposed on the broadcast electric waves of the satellite digital broadcast is taken from the demultiplexer 23 into the system controller 40, and the data of the data broadcast are taken from the demultiplexer 23 into the system controller 40.

At the program recording time, the coded video data and audio data from the demultiplexer 23 are transmitted to the recording/reproducing unit 30 and recorded into a recording medium in the recording/reproducing unit 30.

When the programs of the ground-based analog broadcast or the satellite digital broadcast are reproduced, the coded video data and audio data from the recording medium are reproduced by the recording/reproducing unit 30, and the video data and the audio data thus reproduced are decoded by the video decoder 25 and the audio decoder 26, and further converted to an analog video signal and an analog audio signal respectively The video signal after the conversion is processed in the video processing unit 13, and transmitted to the display device 15. The audio signal after the conversion is processed in the audio processing unit 14, and transmitted to the audio output device 16.

In an OSD (On Screen Display) processing unit 29, program addition information such as EPG information, data of data broadcast, etc. are subjected to OSD processing, and the signals after the processing are combined with the video signal from the tuner 12 or the video decoder 25 in the video processing unit 13.

In addition to the broadcast, the program addition information such as EPG information is also received from a server device serving as a distribution source through an external network 1 such as the Internet by a network interface 51, and taken into the system controller 40.

The system controller 40 controls the respective parts of the receiving apparatus, and it is constructed by CPU, ROM in which programs to be executed by CPU and fixed data are written and RAM functioning as a work area for CPU, etc. as omitted from the drawings.

The system controller 40 is connected to a storage device portion 41 in which the program addition information described above, key words described later and a recorded program list are written. However, some area of the RAM may be used as the storage device portion 41.

The system controller 40 is also connected to a display unit 64 including a remote controller photodetector 62 for detecting an infrared-ray remote control signal from a remote control (remote control) transmitter 61, a panel operating unit 63, a liquid crystal display device for displaying the operation condition and operating status of the receiving apparatus, etc.

Furthermore, a preference degree detecting unit 70 is connected to the system controller 40, and a preference data base 79 is connected to the preference degree detecting unit 70.

The preference degree detecting unit 70 calculates and renews the preference degree of a viewer to each program, and it includes a viewing record counting unit 71, a preference degree calculating unit 72, a preference degree renewing unit 73 and a preference data output unit 74 as shown in FIG. 2. Preference data containing preference degree are accumulated in a preference data base 79.

(Detection of viewing Record . . . FIGS. 3 to 8).

The system controller 40 detects a viewing recorded in the receiving apparatus, and transmits it as viewing record data to the viewing record counting unit 71 of the preference degree detecting unit 70.

In this case, "viewing" means that a program of ground-based analog broadcast or satellite digital broadcast is received and pictures or sounds are output from the monitor device 19, or that a program recorded in the recording medium of the recording/reproducing unit 30 is reproduced and pictures or sounds are output from the monitor device 19. In the following description, the former will be referred to as real broadcast viewing, and the latter will be referred to as reproduction viewing.

As shown in FIG. 3, as the viewing record data are detected a date-and-hour at which a viewer carries out an operation such as a tuning operation or a volume adjusting operation by using the remote control transmitter 61 or the panel operating unit 63, the viewing output state and the operation content at this time and the reproduction position (address) on the recording medium in the case of the reproduction viewing.

FIG. 3 shows an example of the viewing record data when the power of the receiving apparatus is first turned on, a channel 1 of the ground-based analog broadcast is viewed with a volume of level 10, the volume is subsequently turned up to level 11, the volume is subsequently turned down to level 10, the channel is subsequently changed to a channel 8 of the ground-based analog broadcast, the volume is subsequently turned up to level 11, the viewing is subsequently changed to the reproduction viewing and then reproduction is started from the position of vt=030001.

"NoOp" in the operation content represents a case where no other operation than power-on is carried out, and Ch=v3, Ch=video3 represent a video channel in the case of the reproduction viewing.

Even when a viewer carries out no operation for a long time while he/she views a program, the viewing record is detected at a fixed time interval in order to check the viewing output status, and the viewing record data are output. In this case, the operation content is kept blank or "NoOp" is set to the operation content.

Furthermore, the system controller 40 extracts necessary program identification information from the program addition information such as EPG information which is extracted from the broadcast signal as described above or received from the external network 1 by the network interface 51, and transmits the program identification information thus extracted to the viewing record counting unit 71 of the preference degree detecting unit 70.

As the program identification information are used a program ID (identification code), the broadcast start date and hour of a program, the broadcast finish date and hour of the program, a distribution source, a genre, title and content and the reproduction start/finish position on the recording medium in the case of the reproduction viewing as shown in FIG. 4.

The program identification information may be hierarchically described, and the program content may be indicated as lower-layer information like the content of each topic, each commercial, etc. and the start/finish times thereof are indicated as the program content as shown in FIG. 5.

The viewing record counting unit 71 of the preference degree detecting unit 70 counts the viewing record data on the basis of the program identification information every program to generates program viewing record data, and transmits the program viewing record data thus generated to the preference degree calculating unit 72.

As the program viewing record data, the viewing time Dw, the viewing time rate Rc and the total operating frequency are added to a program ID and a viewing source (one of the real broadcast viewing or the reproduction viewing), and program identification information other than the program ID, such as the program title is added as shown at the left side of FIG. 6.

Figure 7:
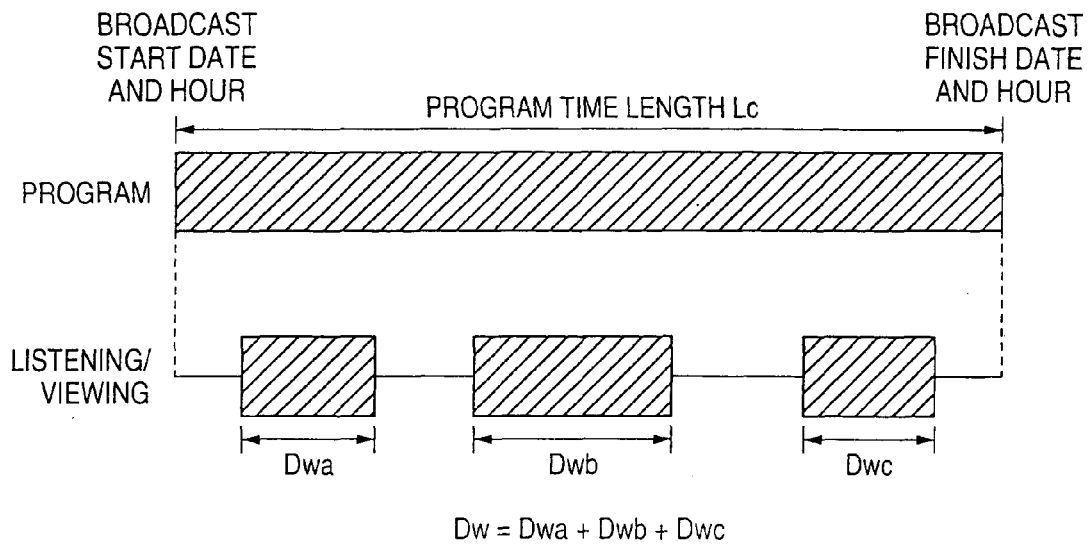
FIG. 7 is a diagram showing viewing time.
Figure 8:
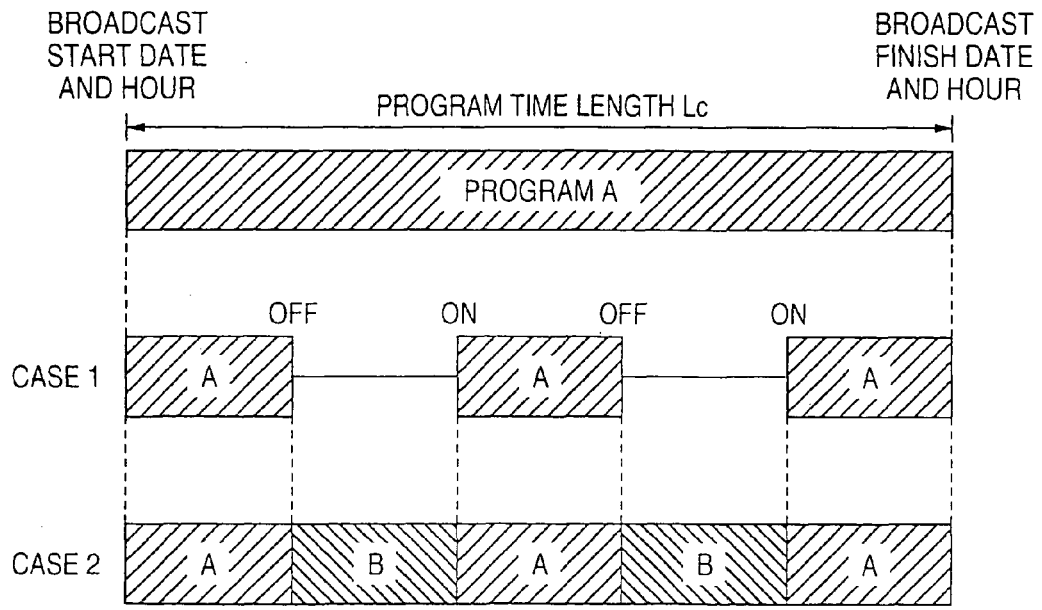
FIG. 8 is a diagram showing an operation during program viewing.

The viewing time Dw is the total viewing time for which the program concerned has been viewed. For example, as shown in FIG. 7, when some program is intermittently viewed while other programs are viewed sometime or the power source of the receiving apparatus is turned out, the viewing time Dw is equal to the sum of the viewing time Dwa, Dwb, Dwc.

The viewing time rate Rc is the rate of the viewing time Dw to the time length Lc of the program concerned, i.e., Dw/Lc.

The total operating frequency is equal to the sum of the volume operating frequency, the tuning operating frequency and the data display operating frequency during viewing of the program concerned. The volume operating frequency is equal to the sum of the volume turn-up operating frequency and the volume turn-down operating frequency.

The tuning operating frequency is the frequency at which an operation of selecting other programs is carried out during viewing of the program concerned. It does not include the frequency of carrying out the power-on/off operation during viewing of the program A concerned like a case 1 of FIG. 8, and it is the frequency of carrying out the operation of selecting another program B during viewing of the program A concerned like a case 2 of FIG. 8. In the case 2, the tuning operating frequency for the program A concerned is equal to twice.

The data display operating frequency is the frequency at which the operation of displaying data on the screen of the display device 15 is carried out during viewing of the program concerned.

With respect to the volume turn-up operating frequency, the preference degree to the program concerned may be estimated to be higher as the volume turn-up operating frequency is increased. With respect to the volume turn-down operating frequency, the preference degree to the program concerned may be generally estimated to be lower as the volume turn-down operating frequency is increased except for a case where the volume is turned down in the middle of the night or the like. The preference degree to the program concerned may be estimated to be lower as the tuning operating frequency is increased. The preference degree to the program concerned may be estimated to be higher as the data display operating frequency is increased.

In consideration of these operating frequencies, the preference degree of a viewer to the program concerned can be more accurately calculated. However, in the following embodiment, the preference degree is calculated while these operating frequencies are left out of consideration in order to calculate the preference degree both more accurately and readily.

In the case of the reproduction viewing, the viewing time based on every date of the week/time zone is calculated as shown at the right side of FIG. 6, and added to the program viewing record data.

For example, when a week after the recording of the program concerned is finished is sectioned every day of the week and every hour in each day of the week, that is, it is sectioned into 24×7=168 time zones, the viewing time based on every day of the week/every hour means a time in each time zone for which the program concerned is reproduced and viewed. In the case of the reproduction viewing, the viewing time Dw of the program concerned is equal to the total of the viewing times based on every day of the week/time zone.

A viewer's reproduction viewing pattern like a viewer has a tendency to reproduce and view a program broadcasted and recorded in the evening on some day of the week, midnight on the next day, can be know by calculating the viewing time based on every day of the week/time zone as described above. Therefore, the automatic reproduction which is matched with the reproduction viewing pattern can be performed as described later.

Figure 9:
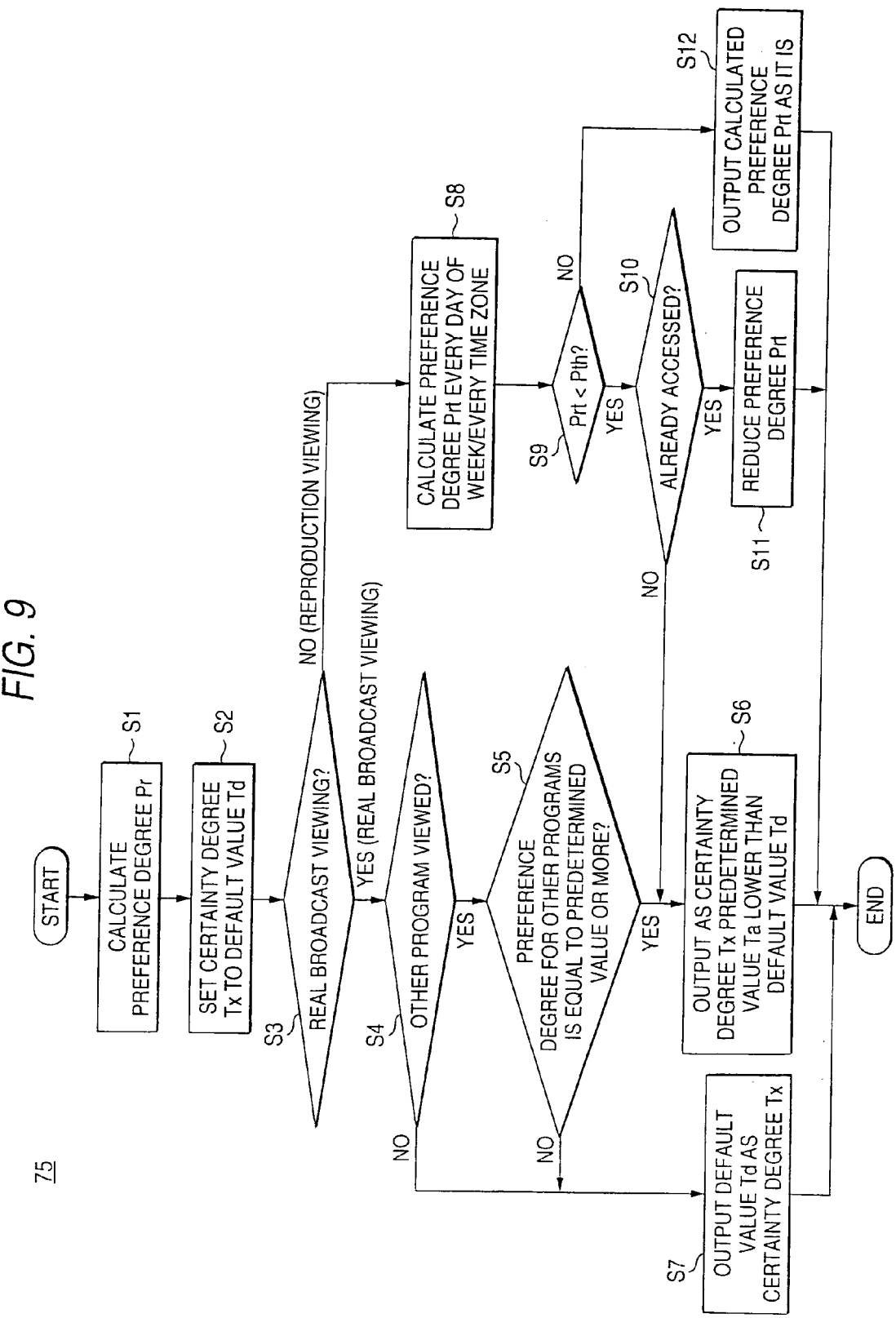
FIG. 9 is a diagram showing an example of a preference primary data calculation processing routine.

(Calculation of Preference Degree ... FIGS. 9 and 10)

In the preference degree calculating unit 72 of the preference degree detecting unit 70, the preference degree Pr of each viewer to the program concerned is calculated from the program viewing record data output from the viewing record counting unit 71.

Specifically, as a preference degree P is calculated the value of a function which is based on the rate Ru (=Dw/Lu) of the viewing time Dw of the program concerned to the unit time Lu and the viewing time rate (the rate of the viewing time Dw of the program concerned to the time length Lc of the program concerned) Rc (=Dw/Lc) and in which the preference degree Pr is larger as the rate Ru is increased and also the preference degree Pr is larger as the viewing time rate Rc is increased. For example, the preference degree Pr is calculated by the equation (1a).

Furthermore, the preference degree calculating unit 72 outputs the certainty degree Tx of the preference degree Pr thus calculated (represents how degree the calculation result is certain) described below.

FIG. 9 shows an example of a calculation processing routine of preference primary data containing the preference degree Pr and the certainty degree Tx carried out by the preference degree calculating unit 72.

In the preference primary data calculation processing routine 75, the preference degree Pr to the program concerned is first calculated as described above in step S1, and then the certainty degree Tx of the preference degree Pr is set to a default value Td in step S2. Thereafter, it is judged in step S3 whether the viewing of the program concerned is the real broadcast viewing or not (real broadcast viewing or reproduction viewing).

In the case where the viewing of the program concerned is the real broadcast viewing, the processing goes from step S3 to step S4 to judge whether another program is also viewed within the broadcast time of the program concerned. If it is judged that the other program is viewed like the case 2 of FIG. 8, the processing goes from step S4 to step S5 to judge whether the preference degree to the other program is equal to a predetermined value or more. The preference degree to the other program is calculated in the same method (by the same calculation) as the preference degree Pr to the program concerned.

When the preference degree to the other program is equal to the predetermined value or more, the preference Pr to the program concerned may be estimated to be lower because the preference degree to the other program is relatively high although the preference degree Pr to the program concerned is originally high. Therefore, the processing goes from step S5 to step S6 to output a predetermined value Ta smaller than the default value Td set in step S2 as a certainty degree Tx of the preference degree Pr to the program concerned, and the preference primary data calculation processing is finished.

That is, when the viewing of the program concerned is the real broadcast viewing, another program is also viewed within the broadcast time of the program concerned and the preference degree to the other program is equal to the predetermined value or more, a relatively low value Ta is output as the certainty degree Tx of the preference degree Pr to the program concerned.

When it is judged in step S4 that no other program is viewed within the broadcast time of the program concerned or it is judged in step S5 that the preference degree to the other program is less than the predetermined value, the processing goes to step S7 to output the default value Td set in step S2 as the certainty degree Tx of the preference degree Pr to the program concerned, and the preference primary data calculation processing is finished.

That is, when the viewing of the program concerned is the real broadcast viewing, no other program is viewed within the broadcast time of the program concerned or another program is viewed, however, the preference degree to the other program is less than the predetermined value, a relatively high value Td is output as the certainty Tx of the preference degree Pr to the program concerned.

On the other hand, when it is judged in step S3 that the viewing of the program concerned is the reproduction viewing, the processing goes from step S3 to step S8 to calculate the preference degree Prt to the program concerned based on every date of the week/time zone. The preference degree Prt based on every date of the week/time zone is calculated with the viewing time based on every date of the week/time zone described above in FIG. 6 set as the viewing time Dw by using the same method (the same calculation equation) as the preference degree Pr to the program concerned.

Subsequently, it is judged in step S9 whether the preference degree Prt based on every date of the week/time zone is less than a threshold value Pth. If it is less than the threshold value Pth, the processing goes from step S9 to step 10 to judge whether there is any record indicating a viewer's access to the position on the recording medium in the recording/reproducing unit 30 at which the program concerned is recorded.

If there is no record indicating the access to the recording position of the program concerned, there is a probability that the preference degree Prt based on every date of the week/time zone is calculated as being low because the viewer does not know that the program concerned is recorded. Therefore, the processing goes from step S10 to step S6 to output a predetermined value Ta smaller than the default value Td as a certainty degree Txt of the preference degree Prt based on every date of the week/time zone.

Conversely, when there is some record indicating an access to the recording position of the program concerned, in order to reflect to the fact that the preference degree Prt based on every date of the week/time zone is calculated as being low although the viewer reproduces and views a part of the program concerned, the processing goes from step S10 to step S11 to reduce the preference degree Prt based on every date of the week/time zone by a predetermined value or at a predetermined rate, and also outputs the default value Td as the certainty degree Txt thereof.

On the other hand, when it is judged in step S9 that the preference degree Prt based on every date of the week/time zone is equal to or more than the threshold value Pth, the processing goes to step S12 and outputs the preference degree Prt calculated in step S8 as it is, and also outputs the default value Td as the certainly degree Txt thereof.

As shown in a simplification style in FIG. 9, the following processing of the step S8 and the subsequent steps in the case of the reproduction viewing is sequentially repeated every time zone of each day of the week, thereby outputting the preference degree Prt and the certainty degree Txt for each of the time zones of total 24×7=168.

The preference degree Pr to the program concerned in the case of the reproduction viewing is calculated as the sum of the preference degrees Prt based on every date of the week/time zone calculated or output as described above after a week from the finish of the recording of the program concerned, or when the program concerned is deleted from the recording medium in the recording/reproducing unit 30 or when the program concerned is reproduced and viewed by 50% or more, for example.

As shown in FIG. 10, the preference degree calculating unit 72 adds the preference degree Pr and the certainty degree Tx as the preference primary data to the program ID every program viewed by the viewer, and further adds the program identification information other than the program ID, such as the program title.

In the preference primary data of FIG. 10, the certainty degree Tx of the preference degree Pr (=0.532) to some program is equal to a relatively high value Td (=0.75), and the certainty Tx of the preference degree Pr (=0.237) to another program is equal to a relatively low value Ta (=0.4).

As omitted from FIG. 10, in the case of the reproduction viewing, the preference degree Prt and certainty degree Txt based on every date of the week/time zone thus calculated or output and the preference degree Pr to the program concerned are added as the preference primary data.

(Renewal of Preference Degree . . . FIG. 11)

In the preference degree renewing unit 73 of the preference degree detecting unit 70, the preference degrees recorded in the preference data base 79 with respect to periodically broadcasted programs are renewed on the basis of the preference primary data output from the preference degree calculating unit 72. The periodically broadcasted programs are programs which are broadcasted with the same titles everyday, weekly or monthly.

As shown in FIG. 11, data achieved by adding the preference degree with respect to the real broadcast viewing, the preference degree with respect to the reproduction viewing and the preference degree based on every date of the week/time zone with respect to the reproduction viewing to the program identification information such as the title, the distribution source, the broadcast date, the broadcast start time, the broadcast finish time, etc. of each of programs which were past viewed by the viewer are recorded as the preference data in the preference data base 79.

When the preference primary data are output from the preference degree calculating unit 72, the preference degree renewing unit 73 judges whether the preference data of a program having the same title as the program indicated by the preference primary data are recorded in the preference data base 79. If it is recorded, the preference degree renewing unit 73 reads out the preference data from the preference data base 79, and renews the preference degree in the preference data by the preference degree Pr in the preference primary data.

Specifically, the preference degree Pr in the preference primary data is added to the preference degree Po in the pre-renewal preference data by some rate, and the preference degree Pn after the addition is set as a post-renewal preference degree.

For example, $$Pn = \alpha \times Pr + (1-\alpha)Po \tag{5}$$

here, $$\alpha = Cx \times Tx \tag{6}$$

Cx represents a constant, and Tx represents the certainty degree as described above.

If α is equal to zero, the preference degree would never renewed. If α is equal to 1, the preference degree Po is completely replaced by the preference degree Pr. Therefore, for example when a viewer views the program concerned from beginning to end without fail everyday or every week, however, he/she can view the program concerned for only a slight time for certain reasons on some day or in some week, the post-renewal preference degree Pn is greatly reduced. Therefore, $0<\alpha<1$.

The viewer may be allowed to set the constant Cx within the range of $0<\alpha<1$. As the coefficient α approaches to 1, the variation of the post-renewal preference degree Pn by the preference degree Pr is larger. On the other hand, as the coefficient α approaches to zero, the variation of the post-renewal preference degree Pn by the preference degree Pr is smaller. Therefore, it is preferable that the constant Cx is set to a large value when the variation of the preference degree of the viewer to a program is large or the preference degree of the viewer to the program is varied while the constant Cx is set to a small value when the variation of the preference degree of the viewer to a program is small or the preference degree of the viewer to the program is not varied.

In the case of the real broadcast viewing, the renewal is applied between the preference degrees with respect to the real broadcast viewing, and in the case of the reproduction viewing, the renewal is applied between the preference degrees every day of week/time zone. Thereafter, the sum of the post-renewal preference degrees every day of week/time zone is set as the post-renewal preference degree with respect to the reproduction viewing.

The preference degree renewing unit 73 rewrites the pre-renewal preference degree Po in the preference data recorded in the preference data base 79 to the post-renewal preference degree Pn, and records the preference data into the preference data base 79.

When the preference data of a program having the same title as the program indicated by the primary data output from the preference degree calculating unit 72 are not recorded in the preference data base 79, it is a case where the viewer views a periodically-broadcasted program for the first time or views a one-shot broadcasted program.

In this case, the preference degree renewing unit 73 sets the pre-renewal preference degree Po to zero or a predetermined value (initial value) and calculates the post-renewal preference degree Pn to create the preference data from the preference primary data, and records the preference data into the preference data base 79.

(Presentation of Program by Preference Data . . . FIG. 12)

In the accumulation type television receiving apparatus of FIG. 1, the programs can be presented to viewers or automatically tuned, automatically recorded or automatically reproduced on the basis of preference data recorded in the preference data base 79 as described above.

<Presentation>

When the viewer instructs program presentation by using the remote control transmitter 61 or the panel operating unit 63, the system controller 40 accesses the preference data base 79 through the preference data output unit 74 of the preference degree detecting unit 70 to read out the preference data from the preference data base 79, processes the preference data in the OSD processing unit 29, and displays on the screen of the display device 15, the title, the distribution source, the broadcast start time, the broadcast finish time, etc. for programs which the viewer past viewed.

In this case, the programs are successively presented from the program having the highest preference degree in the preference data, or only programs whose preference degrees are equal to a predetermined value or more. The viewer can carry out the tuning operation, the recording reservation, etc. while viewing this presentation.

<Automatic Tuning>

The system controller 40 periodically refers to the preference data recorded in the preference data base 79 with no viewer's operation to automatically tune to a program having a preference degree equal to a predetermined value or more at a next broadcast date and hour.

In this case, when another program is being tuned in the same time zone, the other program being tuned is given priority, or when the automatic tuning priority mode is preset by the operation of the viewer, a program having a preference degree equal to the predetermined value or more is automatically tuned in place of the other program being tuned.

When the preference data recorded in the preference data base 79 contain plural programs which have preference degrees equal to the predetermined value or more and broadcasted in the same time zone, the program having the highest preference degree is given priority.

<Automatic Recording>

In the accumulation type television receiving apparatus shown in FIG. 1, when the viewer makes a recording reservation or registers a keyword in the storage device portion 41 through the operation of the remote control transmitter 61 or the panel operating unit 63, the system controller 40 selectively receives and automatically records the recording-reserved program or the program containing the registered keyword in the program addition information such as the program title or the like.

Furthermore, at a next broadcast date and hour, the system controller 40 selectively tunes and automatically records, with no viewer's operation, a program whose preference degree with respect to the reproduction viewing is equal to a predetermined value or more in the preference data recorded in the preference data base 79.

In this case, among the recording based on the recording reservation, the recording based on the registered keyword and the recording based on the preference degree, the highest priority is given to the program recorded on the basis of the recording reservation, the second highest priority is given to the program recorded on the basis of the registered keyword, and the third highest priority is given to the program automatically-recorded on the basis of the preference degree. When automatic deletion is carried out, the order of priorities is opposite to the above priority order.

In addition to the above recording systems, the viewer may record a program by carrying out the recording operation at the reception time of the program concerned or during reception of the program concerned although this is not the automatic recording.

When a program is recorded, the system controller 40 creates a recorded program list and writes it into the storage device portion 41 or rewrites a recorded program list which has been written in the storage device portion 41. When the viewer carries out a list calling operation, the system controller 40 reads out the recorded program list from the storage device portion 41, and displays the recorded program list on the screen of the display device 15 through the processing in the OSD processing unit 29.

In the recorded program list are indicated the recording start date and hour, the recording finish date and hour (or recording time), the distribution source, the program title and the recording reason as shown in FIG. 12.

By viewing this list, the viewer can check which program is recorded for which recording reason, and reproduce the program concerned by selecting the program title in the list.

<Automatic Reproduction>

Furthermore, in the accumulation television receiving apparatus shown in FIG. 1, when the power source of the receiving apparatus is turned on, the system controller 40 automatically reproduces the programs recorded as described above on the basis of the recorded program list written in the storage device portion 41 and the preference data recorded in the preference data base 79 without any operation of the viewer.

Specifically, the system controller 40 detects a time zone in which the viewer carries out the reproduction viewing most frequently, on the basis of the preference degrees based on every date of the week/time zone with respect to the reproduction viewing in the preference data recorded in the preference data base 79, and automatically reproduces, in the time zone thus detected, a recorded program(s) which is/are described in the recorded program list written in the storage device portion 41.

When plural programs having different recording reasons are described in the recorded program list, for example, programs recorded through the viewer's recording operation, programs recorded on the basis of the recording reservation, programs recorded on the basis of registration keywords and programs automatically-recorded on the basis of the preference degrees are automatically reproduced in this order. When plural programs having the same recording reason are described in the recorded program list, these programs are successively automatically reproduced in sequence of recording start date and hour, for example.

(Preference Degree Calculating Method and Preference Degree Renewing Method . . . FIGS. 13 to 15)

As described above, in the preference degree calculating unit 72 of the preference degree detecting unit 70, the value of a function which is based on the rate Ru (=Dw/Lu) of the viewing time Dw of the program concerned to the unit time Lu and the viewing time rate (the rate of the viewing time Dw of the program concerned to the time length Lc of the program concerned) Rc (=Dw/Lc) and in which the preference degree Pr is larger as the rate Ru is increased and also the preference degree Pr is larger as the rate Rc is increased, for example as shown by the equation (1a) described above is calculated as the preference Pr of the viewer to the program concerned from the program viewing record data output from the viewing record counting unit 71.

More specifically, the preference degree Pr is calculated by the equations (1), (2) (3) or (4) shown in FIG. 13. Here, m>0, n>0, and Cr represents a positive constant. The equation (1a) is given in the case of m=n=1 in the equation (1). The unit time Lu may be set to be adjustable by the viewer.

The calculation results of the preference degree Pr based on the models of the equations (1) to (4) are shown in FIGS. 14 and 15.

The programs A, B, C and D are programs of 1 hour, 0.933 hour (56 minutes), 0.25 hour (15 minutes) and 0.167 hour (10 minutes) in time length Lc respectively, and with respect to these programs, a randomly selected viewer answers that he/she has the same preference degree to the respective programs.

The calculated preference degrees Pr when the viewer views these programs A, B, C and D for 0.493 hour (29 minutes and 35 seconds), 0.276 hour (16 minutes and 34 seconds), 0.242 hour (14 minutes and 31 seconds) and 0.157 hour (9 minutes and 25 seconds) respectively are shown with respect to six cases using the models 1 to 6, respectively.

The model 1 corresponds to a case where m=n=1 in the equation (1), the model 2 corresponds to a case where m=n=0.5 in the equation (1), the model 3 corresponds to a case where m=n=1 in the equation (2), the model 4 corresponds to a case where m=n=0.5 in the equation (2), the model 5 corresponds to a case where m=n=1, Cr=1.0 in the equation (3) and the model 6 corresponds to a case where Cr=1.0 in the equation (4). In all the cases, the unit time Lu is set to 1 hour.

Pmax/Pmin represents the ratio of the maximum and minimum values in the preference degree Pr to the programs A, B, C, D in the same model, and it shows the degree of dispersion of the preference degree Pr due to the differences in viewing time Dw (ratio RU) and the viewing time rate RC.

Among the models 1 to 4 shown in FIG. 14, the model 2 has the smallest dispersion, the model 4 has the second smallest dispersion, and the model 3 has the largest dispersion. Accordingly, with respect to the equations (1) and (2), if same m, n are given in the equations (1) and (2), the equation (1) shows a more actual situation than the equation (2). With respect to only the equation (1) or only the equation (2), the case where m=n=0.5 shows a more actual situation than the case where m=n=1.

Between the models 5 and 6 shown in FIG. 15, the model 5 has the smaller dispersion and shows a more actual situation than the model 6. With respect to the equations (3), (4), the equation (3) is more preferable than the equation (4) insofar as m=n=1, Cr=1.0.

The viewing style of the viewer is varied in accordance with the viewer himself/herself, the viewing time or the viewing condition, and thus the system controller is constructed so that the viewer can select any one of the models 1 to 6 or the system controller 40 selects any one of the models 1 to 6 according to a predetermined algorithm in accordance with the viewing style of the viewer.

The equations (1) to (4) may be modified so that Dw/Lc is multiplied by a coefficient k in the equations (1) to (4) or the first term is multiplied by a coefficient a or the second term is multiplied by a coefficient b in the equation (1). Here, the coefficients k, a b are set to positive values.

(Preference Degree Renewing Method . . . FIGS. 16 to 18)

As described above, in the preference degree renewing unit 73 of the preference degree detecting unit 70, the preference degrees to periodically-broadcasted programs which are recorded in the preference data base 79 are renewed on the basis of the preference primary data output from the preference degree calculating unit 72.

That is, specifically, the preference degree Pr in the preference primary data is added to the pre-renewal preference degree Po in the preference data by some rate, and the preference degree Pn after the addition is set as a post-renewal preference degree.

In this case, as a method, the preference degree is renewed by the equation (5) shown in FIG. 16 as described above. It is assumed that the coefficient $\alpha$ is represented by the equation (6) in FIG. 17 as described above.

Furthermore, as another method, the preference degree Pn as a result achieved by adding the pre-renewal preference degree Po and the calculated preference Pr with a ratio of 1:1 as shown in the equation (7) of FIG. 18 is set as the post-renewal preference degree without using the certainty degree Tx.

In this case, when the maximum value Pmax of the preference degree Pn recorded in the preference data base 79 exceeds a threshold value Pth (a value different from the threshold value Pth shown in FIG. 9), all the preference degrees recorded in the preference data base 79 are reduced with the same magnification as represented by the equation (8) of FIG. 18.

Accordingly, the preference degrees Pn recorded in the preference data base 79 can be limited to a fixed range, and also relatively old preference degrees can be reduced to support the time variation of the preferences of viewers.

Other Embodiments

The embodiment of FIG. 1 is associated with the case where programs of ground-based analog broadcast and satellite digital broadcast are received as contents. However, the present invention may be applied to a case where programs of cable television broadcast, ground-based digital broadcast, etc. are received as contents.

Furthermore, the present invention is not limited to broadcast programs, and thus to a television receiving apparatus, but it may be applied to a case where audio information such as music, moving pictures or still pictures or image information such as game soft which are distributed from distribution sources through the Internet or external networks are received and downloaded as contents.

As described above, according to the present invention, the preference degrees of viewers to contents such as broadcast programs can be accurately calculated in conformity with the actual situation, and presentation, automatic reception, automatic recording and automatic reproduction of the contents which are matched with the preferences of the viewers can be performed.

The invention claimed is:

1. A content preference degree calculating method, executed by a processor, in which a preference degree of a viewer to a content corresponding to a series of visually or acoustically recognizable information is calculated from a viewing record of the content concerned, comprising:

calculating, using said processor, as a preference degree Pr, the value of a function which is based on the combination of:

the rate Ru (=Dw/Lu) of a viewing time Dw of the content concerned to a unit time Lu; and the rate Rc (=Dw/Lc) of the viewing time Dw of the content concerned to the time length Lc of the content concerned, wherein the unit time Lu is able to set to a particular value by the viewer; wherein the preference degree Pr increases as the rate Ru is increased and wherein the preference degree Pr increases as the rate Rc is increased;

adjusting the preference degree based on whether the content is viewed in a real broadcast viewing or a reproduction viewing;

adding the calculated preference degree to a preference degree recorded in a storage device portion by some rate, and recording the preference degree after the addition as a post-renewal preference degree into the storage device portion wherein when a maximum value of the preference degree recorded in the storage device portion exceeds a threshold value, all the preference degrees recorded in the storage device portion are reduced with a same magnification and calculated based on a pre-renewal preference degree recorded in the storage device portion.

2. A content presenting method for presenting, under the control of a controller, contents having preference degrees that are recorded in the storage device portion by the content preference degree calculating method as claimed in claim 1 and are equal to or greater than a predetermined value.

3. A content receiving method for receiving, under the control of a controller, contents having preference degrees that are recorded in the storage device portion by the content preference degree calculating method as claimed in claim 1 and are equal to or greater than a predetermined value.

4. A content receiving and recording method for receiving under the control of a controller, contents having preference degrees that are recorded in the storage device portion by the content preference degree calculating method as claimed in claim 1 and are equal to or greater than a predetermined value, and recording the contents into a recording medium.

5. A content receiving apparatus comprising:

a receiving unit for receiving a content corresponding to a series of visually or acoustically recognizable information;

a preference degree calculating unit for calculating a preference degree of a viewer to the content concerned from a viewing record of contents received by the receiving unit;

an adjusting unit for adjusting the preference degree based on whether the content is viewed in a real broadcast viewing or a reproduction viewing;

a storage device portion in which data containing content identification information and preference degrees to contents identified by the content identification information are recorded; and a preference degree renewing unit for adding a preference degree calculated in said preference degree calculating unit to a preference degree recorded in said storage device portion by some rate, and recording the preference degree after the addition as a post-renewal preference degree into said storage device portion, wherein said preference degree calculating unit calculates, as a preference degree Pr, the value of a function which is based on the combination of:

the rate Ru (=Dw/Lu) of a viewing time Dw of the content concerned to a unit time Lu; and the rate Rc (=Dw/Lc) of the viewing time Dw of the content concerned to the time length Lc of the content concerned, wherein the unit time Lu is able to set to a particular value by the viewer; and wherein the preference degree Pr increases as the rate Ru is increased and the preference degree Pr increases as the rate Rc is increased, wherein when a maximum value of the preference degree recorded in the storage device portion exceeds a threshold value, all the preference degrees recorded in the storage device portion are reduced with a same magnification and calculated based on a pre-renewal preference degree recorded in the storage device portion.

6. The content receiving apparatus as claimed in claim 5, further comprising:

a controller for receiving through said receiving unit contents having preference degrees that are recorded in said storage device portion and are equal to or exceed a predetermined.

7. A content receiving, recording and reproducing apparatus comprising:

a receiving unit for receiving a content corresponding to a series of visually or acoustically recognizable information;

a recording/reproducing unit for recording the content received by said receiving unit into a recording medium, and reproducing the content from the recording medium;

a preference degree calculating unit for calculating the preference degree of a viewer to the content concerned from a viewing record of the content received by said receiving unit or a viewing record of the content reproduced from the recording medium;

an adjusting unit for adjusting the preference degree based on whether the content is viewed in a real broadcast viewing or a reproduction viewing;

a recording device portion in which data containing content identification information and preference degrees to contents identified by the content identification information are recorded; and preference degree renewing unit for adding a preference degree calculated in said preference degree calculating unit to a preference degree recorded in said recording device portion by some rate, and recording the preference degree after the addition as a post-renewal preference degree into said recording device portion, wherein said preference degree calculating unit calculates, as a preference degree Pr, the value of a function which is based on the combination of:

the rate Ru (=Dw/Lu) of a viewing time Dw of the content concerned to a unit time Lu; and the rate RC (=Dw/Lc) of the viewing time Dw of the content concerned to the time length Lc of the content concerned, wherein the unit time Lu is able to set to a particular value by the viewer; and wherein the preference degree Pr increases as the rate Ru is increased and the preference degree Pr increases as the rate RC is increased, wherein when a maximum value of the preference degree recorded in the recording device portion exceeds a threshold value, all the preference degrees recorded in the recording device portion are reduced with a same magnification and calculated based on a pre-renewal preference degree recorded in the recording device portion.

8. The content receiving, recording and reproducing apparatus as claimed in claim 7, further comprising:

a controller for receiving through said receiving unit contents having preference degrees that are recorded in said recording device portion and are equal to or greater than a predetermined value, and recording the contents into said recording medium through said recording/reproducing unit.

9. The content preference degree calculating method as claimed in claim 1, wherein the preference degree Pr is a function of volume turn-up frequency.

10. The content receiving apparatus as claimed in claim 5, wherein the preference degree Pr is a function of volume turn-up frequency.

11. A content receiving, recording and reproducing apparatus as claimed in claim 7, wherein the preference degree Pr is a function of volume turn-up frequency.

* * * * *